(12) United States Patent
Pattisall

(10) Patent No.: US 6,471,413 B1
(45) Date of Patent: Oct. 29, 2002

(54) METHOD AND APPARATUS FOR PROTECTING FIBER OPTIC CONNECTORS

(75) Inventor: Charles Adam Pattisall, Bel Air, MD (US)

(73) Assignee: Lucent Technologies Inc., Murray Hill, NJ (US)

(*) Notice: Subject to any disclaimer, the term of this patent is extended or adjusted under 35 U.S.C. 154(b) by 29 days.

(21) Appl. No.: 09/811,004

(22) Filed: Mar. 16, 2001

Related U.S. Application Data

(60) Provisional application No. 60/190,439, filed on Mar. 17, 2000.

(51) Int. Cl.[7] ............................................. G02B 6/36
(52) U.S. Cl. .................................. 385/53; 385/135
(58) Field of Search ........................... 385/53, 135–139, 385/134

(56) References Cited

U.S. PATENT DOCUMENTS 5,179,618 A * 1/1993 Anton ........................ 385/136
6,236,725 B1 * 5/2001 Rodgers ..................... 385/134

* cited by examiner

Primary Examiner—Phan T. H. Palmer
(74) Attorney, Agent, or Firm—Barnes & Thornburg

(57) ABSTRACT

A protective device for an optical coupling located in an enclosure defined at least in part by spaced first and second planes. The optical coupling is located nearer to the first plane than to the second plane. The protective device includes a closure configured to engage the coupling, and a handle having a first end coupled to the closure to permit manipulation of the closure by manipulation of the handle, and a second end. The length of the device is such that, when the closure engages the coupling, the second end is nearer to the second plane than to the first plane.

20 Claims, 3 Drawing Sheets

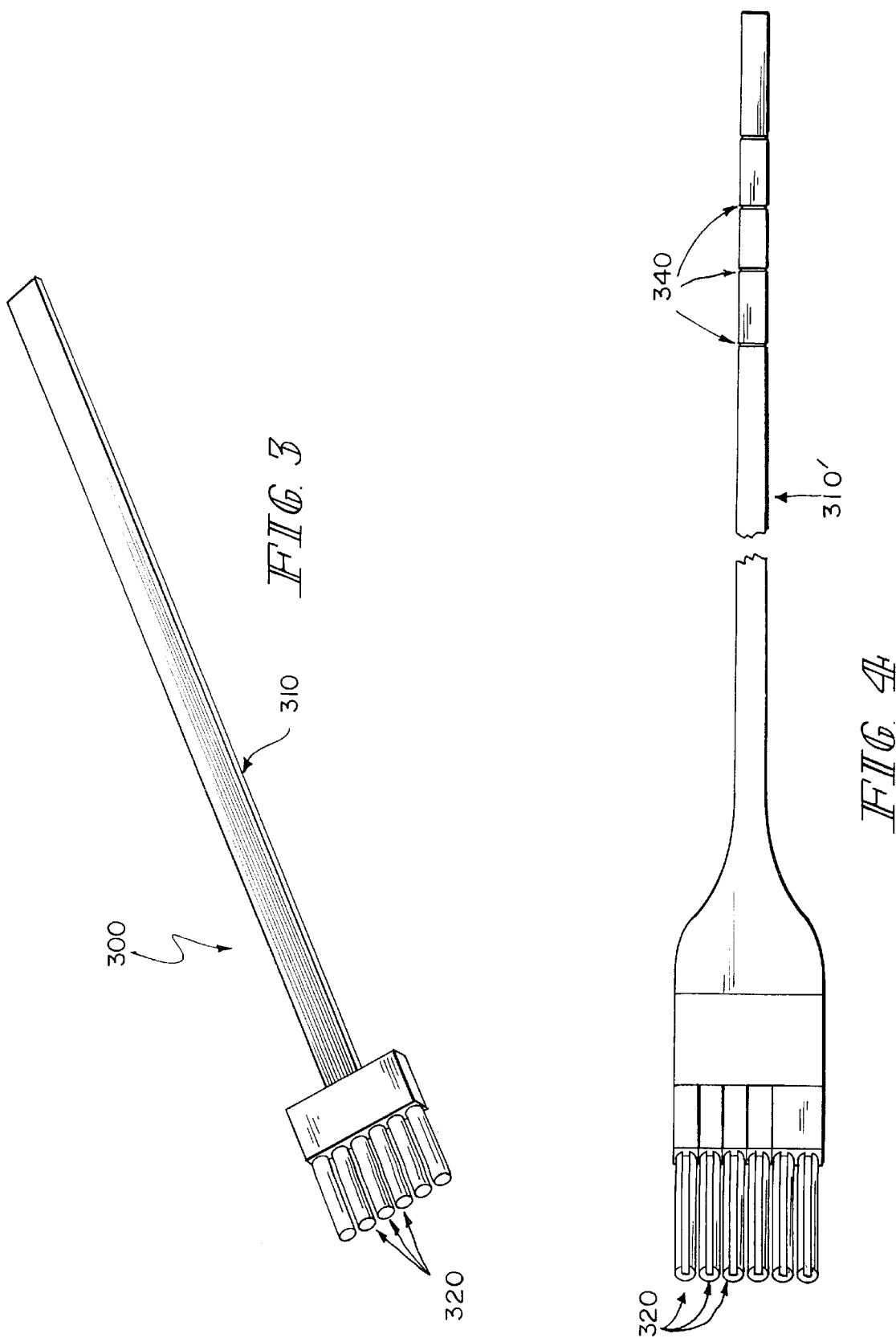

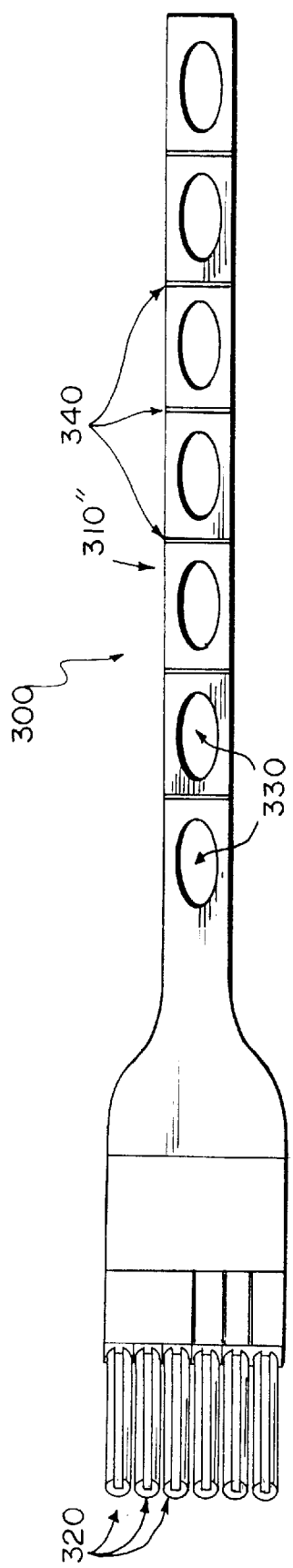
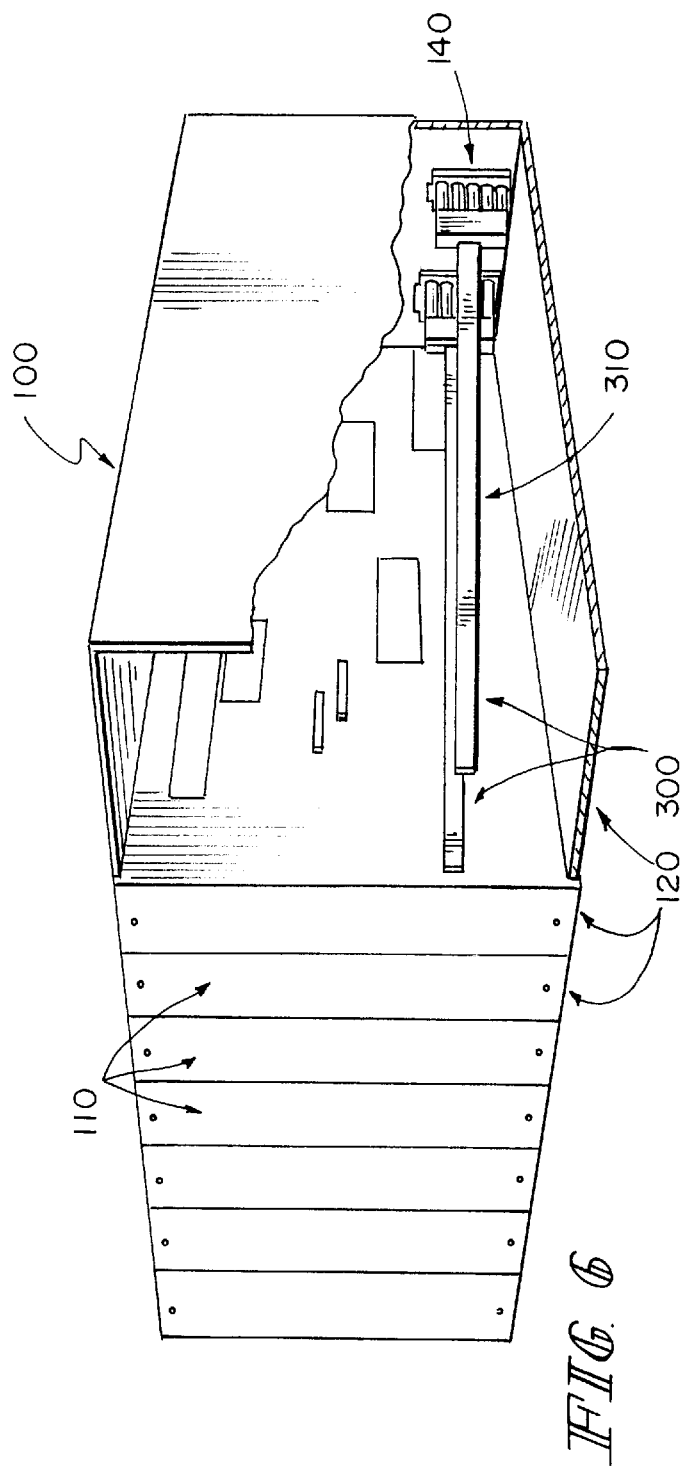

METHOD AND APPARATUS FOR PROTECTING FIBER OPTIC CONNECTORS

This application claims the benefit of provisional application No. 60/190,439 filed on Mar. 17, 2000.

FIELD OF THE INVENTION

The present invention discloses a method and apparatus for protecting fiber optic connectors against the entry of dust and other debris.

BACKGROUND OF THE INVENTION

Optical fibers are widely used in modern communications systems. Similar to electrical communications systems, fiber optic telecommunications systems often comprise modules. These modules contain optical and electrical components. An equipment rack or cabinet in a fiberoptic network installation will typically house a number of these fiber optic communications modules. In such arrangements, the modules are typically inserted into bays or slots in the rack or cabinet. The back of the rack or cabinet typically includes a backplane having fiber optic connectors arranged in a standard configuration. When a module is inserted into a slot in the cabinet, the fiber optic connectors of the module are physically and optically coupled to the fiber optic connectors of the backplane, and thus to the network. This protects the connectors against the entry of dust, debris and moisture.

Frequently, however one or more of the slots in a cabinet will not contain a module. It is therefore necessary to prevent dust, moisture and debris from collecting on the fiber optic connectors of the backplane some other way. To solve this problem, caps or plugs of the type illustrated in FIG. 2 may be fitted to the connectors. However, currently available caps have handles that are many centimeters shorter than the depth of typical fiberoptic equipment cabinet. The width of a module is typically only a few centimeters. This requires the technician to reach into a cavity often only a few centimeters wide, deep into the cabinet, with his or her hand, or with a (usually metal) tool unsuited to the purpose, to grasp the short handled dust cap, and to pull with some force on it to remove it from the fiber optic connector. During this time, immediately adjacent the technician's hand or the tool is exposed electrical circuitry, typically with power being supplied to it. The technician must be careful lest he or she come into contact with the circuitry under power, or permit the tool being used to remove the dust cap(s) come into contact with the circuitry under power. One solution would be for the operator to switch off the power to the panel. However, switching off the power to the panel may disrupt an entire communication network, so switching off the power often is really not an acceptable solution.

Generally, each slot in a panel has a plurality of fiber optic connectors in a known configuration. However, as illustrated in FIG. 2, currently available protective closures are discrete, so that each time a module is inserted into or removed from a slot, a number of protective closures must be removed or inserted. This requires the operator to perform the above mentioned operation a number of times.

SUMMARY OF THE INVENTION

A protective device is provided for an optical coupling located in an enclosure defined at least in part by spaced first and second planes. The optical coupling is located nearer to the first plane than to the second plane. The protective device includes a closure configured to engage the coupling, and a handle having a first end coupled to the closure to permit manipulation of the closure by manipulation of the handle, and a second end. The length of the device is such that, when the closure engages the coupling, the second end is nearer to the second plane than to the first plane.

Illustratively according to the invention, the enclosure is a cabinet for housing modules having optical components.

Further illustratively according to the invention, the first plane is a back plane of the enclosure, and the second plane is defined at least in part by a front surface of a module.

Illustratively according to the invention, the optical coupling includes multiple optical couplings, and the device includes multiple closures.

Additionally illustratively according to the invention, the multiple optical couplings are arranged in a standard configuration. The multiple closures are arranged in the standard configuration for placement over the multiple optical couplings.

Illustratively according to the invention, the handle has at least one opening to facilitate manipulation of the device.

Illustratively according to the invention, the handle has at least one region which facilitates shortening of the handle.

Illustratively according to the invention, the closure comprises a plug.

Alternatively illustratively according to the invention, the closure comprises a cap.

In an exemplary embodiment of the invention, a protective closure includes a handle having a length approximately equal to the depth of a slot in a panel. This construction has advantages over the prior art. An operator may insert or remove the protective closure without the use of special tools. Because it is not necessary to use tools, the risk of the technician or a tool wielded by the technician coming into contact with electrical circuitry under power on an adjacent module is reduced.

In another exemplary embodiment of the invention, a protective closure includes a plurality of plugs or caps configured for coupling with a corresponding plurality fiber optic connectors in a standard configuration. This construction has advantages over the prior art. The number of insertion or removal operations is reduced.

In another exemplary embodiment of the invention, a protective closure comprises a handle having points of reduced thickness along the length that facilitate breaking the handle. This construction has advantages over the prior art. The depth of panels may vary, so a handle having "break-points" facilitates shortening a handle to a desired length.

In another exemplary embodiment of the invention, a protective closure comprises a handle having at least one opening of sufficient size to receive, for example, a finger of a technician. This construction has advantages over the prior art. An opening in the handle facilitates manipulation of the handle. Other features and advantages of the invention will become apparent from the description that follows.

BRIEF DESCRIPTION OF THE DRAWINGS

The invention may best be understood by referring to the following detailed description and accompanying drawings which illustrate the invention. In the drawings:

FIG. 3 illustrates a perspective view of an embodiment of the present invention;

FIG. 4 illustrates a plan view of an embodiment of the present invention;

FIG. 5 illustrates a plan view of an embodiment of the present invention; and,

FIG. 6 illustrates a partly broken away perspective view of a panel and exemplary embodiments of the present invention in use.

DETAILED DESCRIPTION OF ILLUSTRATIVE EMBODIMENTS

Figure 1:
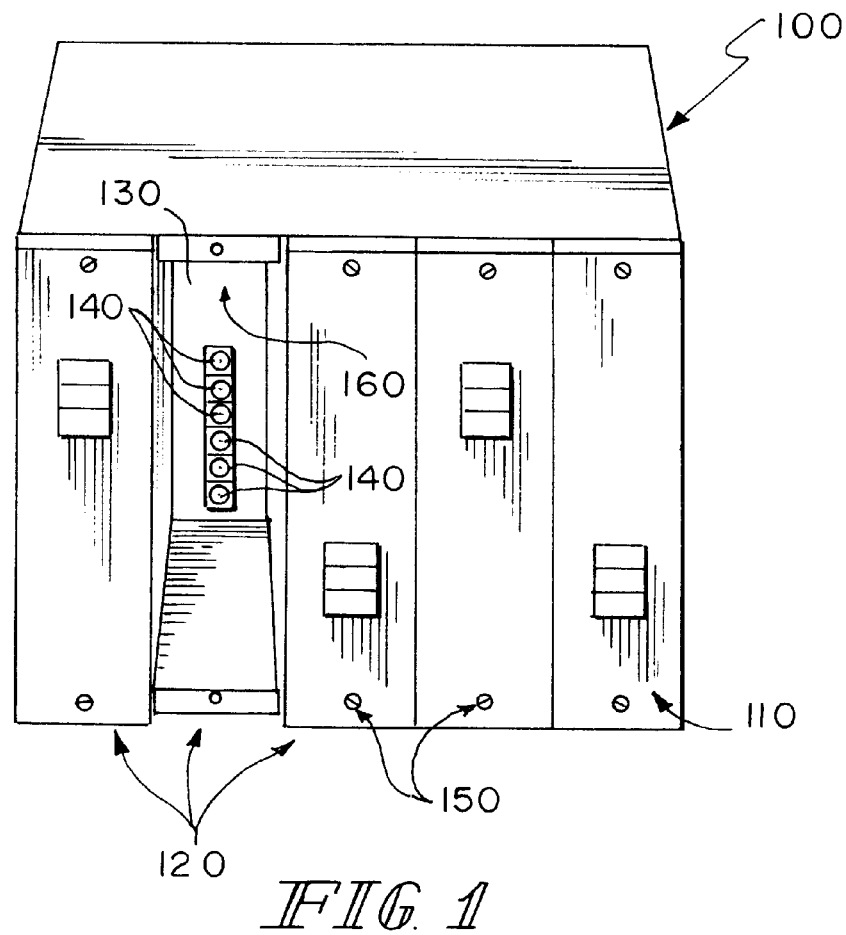
FIG. 1 illustrates a front elevational view of a panel of equipment of the type in connection with which the present invention is useful.

Referring now to FIG. 1, a fiber optic cabinet 100 includes a cluster, or block, 130 of fiber optical connectors in a standard configuration. Connector block 130 includes individual fiber optical connectors 140. Block 130 is typically mounted to a connector panel 160 of cabinet 100. Connectors 140 are illustratively integrated into block 130. However, connectors 140 could also be discrete. In a situation where the connectors. 140 are discrete, the connectors 140 would be individually mounted to panel 160. Although six connectors 140 in a standard configuration are illustrated, the present invention could be fabricated for use with one or many connectors 140 in any configuration.

Fiber optic modules 10 are inserted into panel slots 120. Fasteners 150 secure modules 110 in their respective slots 120. The connectors 140 are shown arranged in a straight line in this illustrative embodiment, however the present invention could be fabricated for use with any arrangement of connectors 140.

Modules 110 have optical connectors (not shown) that are optically and physically coupled with panel optical connectors 140 when modules 110 are inserted into respective slots 120. When a slot 120 has no module 110 inserted into it, the connectors 140 associated with that slot 120 are exposed to foreign matter such as dust, moisture and debris. The accumulation of foreign matter on the optics of any one of connectors 140 can degrade optical communications in the network.

Figure 2:
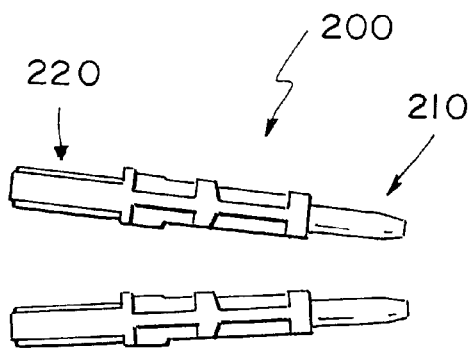
FIG. 2 illustrates a plan view of several prior art closures.

Turning to FIG. 2, a prior art closure 200 includes a plug 220 and handle 210. The illustrated plug 220 is configured for insertion into an individual connector 140. The length of handle 210 of the prior art closure 200 plainly is less than the depth of the illustrated cabinet 100.

Turning to FIG. 3, a closure apparatus 300 includes one or more closures 320 and handle 310. Closures 320 illustratively are plugs of a standard configuration for inserting into individual connectors 140 of a standard configuration, caps of a standard configuration for placing over individual connectors 140 of a standard configuration, or constructions including plugs and caps. The length of handle 310 of closure apparatus 300 is at least substantially the distance from a connector 140 to the front of an illustrative cabinet 100. Closure apparatus 300 is typically constructed from an electrically non-conductive filled or unfilled resin. However, closure apparatus 300 could be fabricated from almost any material which is sufficiently stiff to urge closures 320 onto, and permit their removal from, connectors 140.

Turning to FIG. 4, another illustrative handle 310' has one or more reduced strength areas 340. Areas 340 provide sites at which handle 310' can conveniently and selectively be broken or cut, for example, with a pair of wire cutters or shears, to shorten it to a desired length. While the illustrated areas 340 are lines which extend generally perpendicular to the length of the handle 310', it should be understood by one skilled in the art that other angles, patterns, or the like could be used.

Turning to FIG. 5, another illustrative handle 310" includes one or more openings 330. These openings 330 are intended to facilitate manipulation of the handle 310" by a technician. Illustratively, handle 310" includes openings 330 and areas 340 of the type discussed in connection with the embodiment illustrated in FIG. 4, or handle 310" can include openings 330 but not areas 340. In the illustrated embodiment, openings 330 have somewhat the round to oval shape of a cross section a human finger. Again, however, one skilled in the art will appreciate that other shapes can serve equally well for these purposes.

Referring now to FIG. 6, a partly broken away perspective view of an illustrative fiber optic equipment cabinet 100 illustrates an embodiment of the invention in use. Modules 110 are inserted into all slots 120 except for the rightmost (when viewed from the front of the cabinet 100) slot 120. Closure apparatus 300 of the present invention are inserted into standard configuration panel optical connectors 140. Handles 310 of closure apparatus 300 extend approximately to the front of cabinet 100.

What is claimed is:

1. A protective device for an optical coupling located in an enclosure defined at least in part by spaced first and second planes, the optical coupling located nearer to the first plane than to the second plane, the protective device including a closure configured to engage the coupling, and a handle having a first end coupled to the closure to permit manipulation of the closure by manipulation of the handle, and a second end, the length of the device being such that, when the closure engages the coupling, the second end is nearer to the second plane than to the first plane.

2. The protective device of claim 1 wherein the optical coupling includes multiple optical couplings, the device including multiple closures.

3. The protective device of claim 2 wherein the multiple optical couplings are arranged in a standard configuration, and the multiple closures are arranged in the standard configuration for placement over the multiple optical couplings.

4. The protective device of claim 3 wherein the handle has at least one opening.

5. The protective device of claim 4 wherein the handle has at least one region which facilitates shortening of the handle.

6. The protective device of claim 3 wherein the multiple closures are plugs.

7. The protective device of claim 3 wherein the multiple closures are caps.

8. The protective device of claim 3 wherein the handle has at least one region which facilitates shortening of the handle.

9. The protective device of claim 2 wherein the handle has at least one opening.

10. The protective device of claim 9 wherein the handle has at least one region which facilitates shortening of the handle.

11. The protective device of claim 2 wherein the handle has at least one region which facilitates shortening of the handle.

12. The protective device of claim 1 wherein the handle has at least one opening.

13. The protective device of claim 12 wherein the handle has at least one region which facilitates shortening of the handle.

14. The protective device of claim 1 wherein the handle has at least one region which facilitates shortening of the handle.

15. The protective device of claim 1 wherein the enclosure is a cabinet for housing modules having optical components.

16. The protective device of claim 1 wherein the first plane is a back plane of the enclosure.

17. The protective device of claim 1 wherein the closure comprises a plug.

18. The protective device of claim 1 wherein the closure comprises a cap.

19. A protective device for an optical coupling located in an enclosure, the enclosure defined at least in part by an enclosure front and an enclosure back, the optical coupling mounted at the back of the enclosure, the protective device including a closure configured to engage the coupling, and a handle having a first end coupled to the closure to permit manipulation of the closure by manipulation of the handle, and a second end, the length of the device being such that the closure can be manipulated to engage the optical coupling by manipulation of the second end from adjacent the front of the enclosure.

20. The protective device of claim 19 wherein the optical coupling includes multiple optical couplings arranged in a standard configuration, the device including multiple closures arranged in the standard configuration for placement over the multiple optical couplings.

* * * * *